United States Patent
Kerkar et al.

(10) Patent No.: US 6,258,161 B1
(45) Date of Patent: *Jul. 10, 2001

(54) MASONRY BLOCKS AND MASONRY CONCRETE ADMIXTURE FOR IMPROVED FREEZE-THAW DURABILITY

(75) Inventors: Awdhoot V. Kerkar, Chelmsford; Craig T. Walloch; Kati Hazrati, both of Arlington, all of MA (US)

(73) Assignee: W. R. Grace & Co.-Conn., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 45 days.

(21) Appl. No.: 09/408,255

(22) Filed: Sep. 29, 1999

Related U.S. Application Data

(60) Provisional application No. 60/126,520, filed on Mar. 26, 1999, and provisional application No. 60/106,954, filed on Nov. 4, 1998.

(51) Int. Cl.$^7$ ................................................. C04B 24/12
(52) U.S. Cl. ........................ 106/808; 106/725; 106/727; 106/806; 106/823
(58) Field of Search ................................ 106/725, 727, 106/808, 823, 806

(56) References Cited

U.S. PATENT DOCUMENTS

| | | | |
|---|---|---|---|
| 3,663,251 | 5/1972 | Moren et al. | 106/90 |
| 4,116,706 | 9/1978 | Previte | 106/90 |
| 4,209,336 | 6/1980 | Previte | 106/90 |
| 4,209,337 | 6/1980 | Wagner et al. | 106/96 |
| 4,223,732 | 9/1980 | Carriay et al. | 166/291 |
| 4,547,223 | 10/1985 | Goto et al. | 106/90 |
| 4,814,014 | 3/1989 | Arfaei | 106/90 |
| 4,913,741 * | 4/1990 | Lane et al. | 106/664 |
| 4,960,465 | 10/1990 | Arfaei | 106/724 |
| 4,992,104 | 2/1991 | Boutevin | 106/724 |
| 5,099,922 | 3/1992 | Ganguli | 166/293 |
| 5,133,409 | 7/1992 | Bour et al. | 166/293 |
| 5,147,565 | 9/1992 | Bour et al. | 252/8.551 |
| 5,174,820 | 12/1992 | Sakuta et al. | 106/724 |
| 5,213,161 | 5/1993 | King et al. | 166/293 |
| 5,220,960 | 6/1993 | Totten et al. | 166/293 |
| 5,281,270 | 1/1994 | Totten et al. | 106/687 |
| 5,298,069 | 3/1994 | King et al. | 106/686 |
| 5,298,070 | 3/1994 | Cowan | 106/724 |
| 5,330,006 | 7/1994 | Nahm et al. | 166/293 |
| 5,679,150 | 10/1997 | Kerkar et al. | 106/808 |
| 5,720,807 * | 2/1998 | Izumi et al. | 106/696 |
| 5,782,972 * | 7/1998 | Abelleira et al. | 106/696 |
| 5,897,699 * | 4/1999 | Chatterji et al. | 106/678 |
| 5,900,053 * | 5/1999 | Brothers et al. | 106/678 |

FOREIGN PATENT DOCUMENTS

| | | |
|---|---|---|
| 2032491 * | 5/1980 | (GB) . |
| 2096591A | 3/1982 | (GB) . |
| 2292141A | 8/1995 | (GB) . |
| 78-117681 | 9/1978 | (JP) . |
| 55-47259 | 4/1980 | (JP) . |
| 58-60293 | 4/1983 | (JP) . |
| 58-140364 | 8/1993 | (JP) . |
| 94-73339 | 4/1994 | (JP) . |
| 7-291762 | 11/1995 | (JP) . |
| 11-71146 * | 3/1999 | (JP) . |

OTHER PUBLICATIONS

Chemical Admixtures for Concrete, M.R. Rixom and N.P. Mailvaganam, E. & F.N. Spon, London, New York, pp. 97–100 (1986)(no month).

Triton X–Series Surfactants, Nonionic Octylphenol Polyether Alcohols, Union Carbide Corporation, 1997, pp. 1–20. (no month).

UK Search Report, The Patent Office, Feb. 7, 2000, 1 page.

* cited by examiner

*Primary Examiner*—Anthony Green
(74) *Attorney, Agent, or Firm*—Craig K. Leon; William L. Baker

(57) ABSTRACT

A masonry concrete, for use in making segmental retaining wall units, pavers, blocks, and the like, having zero slump and incorporating betaine for improving freeze-thaw durability, and optionally efflorescent control agents and/or water reducer agents. Exemplary admixtures and methods of improving the freeze-thaw durability of masonry units are also disclosed.

22 Claims, 2 Drawing Sheets

MASONRY BLOCKS AND MASONRY CONCRETE ADMIXTURE FOR IMPROVED FREEZE-THAW DURABILITY

This application claims benefit to Provisional Nos. 60/106,954 filed Nov. 4, 1998 and 60/126,520 filed Mar. 26, 1999.

FIELD OF THE INVENTION

The present invention relates to masonry concrete having improved freeze-thaw durability and to admixtures for achieving such improved freeze-thaw durability, and in particular to masonry units containing betaine as an air entraining agent, which may be used in combination with efflorescence control admixtures.

BACKGROUND OF THE INVENTION

Masonry units, sometimes referred to as concrete masonry units (CMUs), include segmental retaining wall (SRW) units, pavers, and architectural blocks, all of which are made from a "masonry concrete," which is comprised of hydratable cement binder and relatively fine aggregate (e.g., particles of which less than 5% have a diameter of greater than 0.375 inch). Masonry concrete lacks the coarse aggregate (typically greater than 0.5 inch diameter) that is further used in conventional concrete, such as, for example, ready-mix concrete.

More significantly, masonry concrete differs from conventional concrete because it is said to have zero "slump," or, to phrase it more accurately, a practically immeasurable fluidity. The slump property is determined by compacting wet masonry concrete into an inverted cone and then removing the cone, and measuring the distance (if any) by which the cone-molded sample drops in height. See ASTM C143 (1988) ("Standard Test Method for Slump of Portland Cement Concrete"). Typically, the slump of masonry concrete is 0–0.75 inches, and thus masonry concrete is said to have essentially "zero slump."

The present inventors have discovered that the use of efflorescence control admixtures (ECAs), which are sometimes referred to as integral water repellants, such as calcium stearate dispersion, fatty acids, their salts or esters, oils, etc., may cause an appreciable loss of freeze-thaw durability in masonry units (e.g., made of zero slump masonry concrete). Efflorescence is the appearance of white, patchy stains on the face of masonry units during their manufacture or after their installation in the field. Once installed in the field, the masonry blocks are subjected to routine weathering conditions, one of them being alternate freezing and thawing (F/T) cycles. Recent testing of F/T durability of masonry units (SRW), using the ASTM C 1262 (1995) test method in the lab, revealed severe adverse effects of ECAs on the F/T durability of masonry units.

The present inventors therefore considered conventional air entraining agents (AEAs) which are known to increase F/T durability in conventional concrete. Conventional AEAs, such as gum rosin, VINSOL (tm) resin, and Tall Oil Fatty Acids, were evaluated for their ability to provide empty space within masonry concrete for receiving water that is displaced by ice formation, thus avoiding dangerous pressure-build up under freeze-thaw conditions. However, the inventors surprisingly discovered that conventional AEAs did not work in zero slump masonry units.

It should be mentioned here that AEAs operate to "entrain" air rather than to "entrap" it. AEAs stabilize air present in the mix (e.g., dissolved in mix water, folded-in and mechanically enveloped during mixing, present in inter-granular spaces of cement, etc.). This is manifested by essentially spherical bubbles, typically between 0.001–1.25 mm. diameter, seen distributed relatively uniformly within the cement paste portion of the mix.

It is surmised by the present inventors that the nature of masonry units impedes the use of conventional AEAs because masonry concrete has smaller cement paste volumes than conventional concrete and because the masonry concrete mix is less fluid than a conventional concrete mix. This is also perhaps due to the fact that masonry concrete employs only relatively fine aggregate and has a zero slump characteristic. Combined with the fact that masonry concrete tends to have larger compaction void volume (i.e., interconnected voids which are not the same as entrained air voids), the very nature of masonry units thus defeats the efficacy of AEAs in entraining tiny air bubbles in the paste portion of masonry concrete mixes, and thus the attainment of F/T durability in masonry concrete is curtailed.

Accordingly, an improved masonry concrete admixture and masonry concrete having improved F/T durability are needed.

SUMMARY OF THE INVENTION

In surmounting the disadvantages of the prior art, the present invention provides an improved masonry concrete composition in which a betaine, which is an amphoteric air entrainer, is successfully used for entraining air in "zero slump" masonry concrete, thereby rendering it possible to incorporate efflorescence control admixtures (ECAs), such as fatty acid ECAs, into the masonry unit while minimizing the adverse effect that such ECAs have on their freeze-thaw durability.

An exemplary masonry concrete composition of the present invention therefore comprises a hydratable cement binder comprising 5–25% based on total dry weight of the composition; a relatively fine aggregate portion comprising 75–95% based on total dry weight of solids in the composition; a betaine in the amount of 0.01–1.0%, and more preferably 0.05–0.5% (solids on solids (s/s) cement); the composition, when wet, having essentially zero slump when tested by the standard cone method for measuring slump. Indeed, it was found that tiny air bubbles could be entrained in the cement paste fraction of the masonry units. The presence of such air bubbles is the key to the significant improvement in the F/T durability of masonry units.

The use of betaine surfactants are not only believed to be effective in entraining air in masonry units in the presence of ECAs, particularly fatty acid ECAs, but are also believed to be highly effective in entraining air in—and thus improving the freeze-thaw durability of—all masonry units in general.

Further features and advantages of the invention are provided hereinafter.

BRIEF DESCRIPTION OF THE DRAWINGS

A comprehension of the following detailed description may be facilitated by reference to the accompanying figures, wherein.

DETAILED DESCRIPTION OF EXEMPLARY EMBODIMENTS

Figure 1:
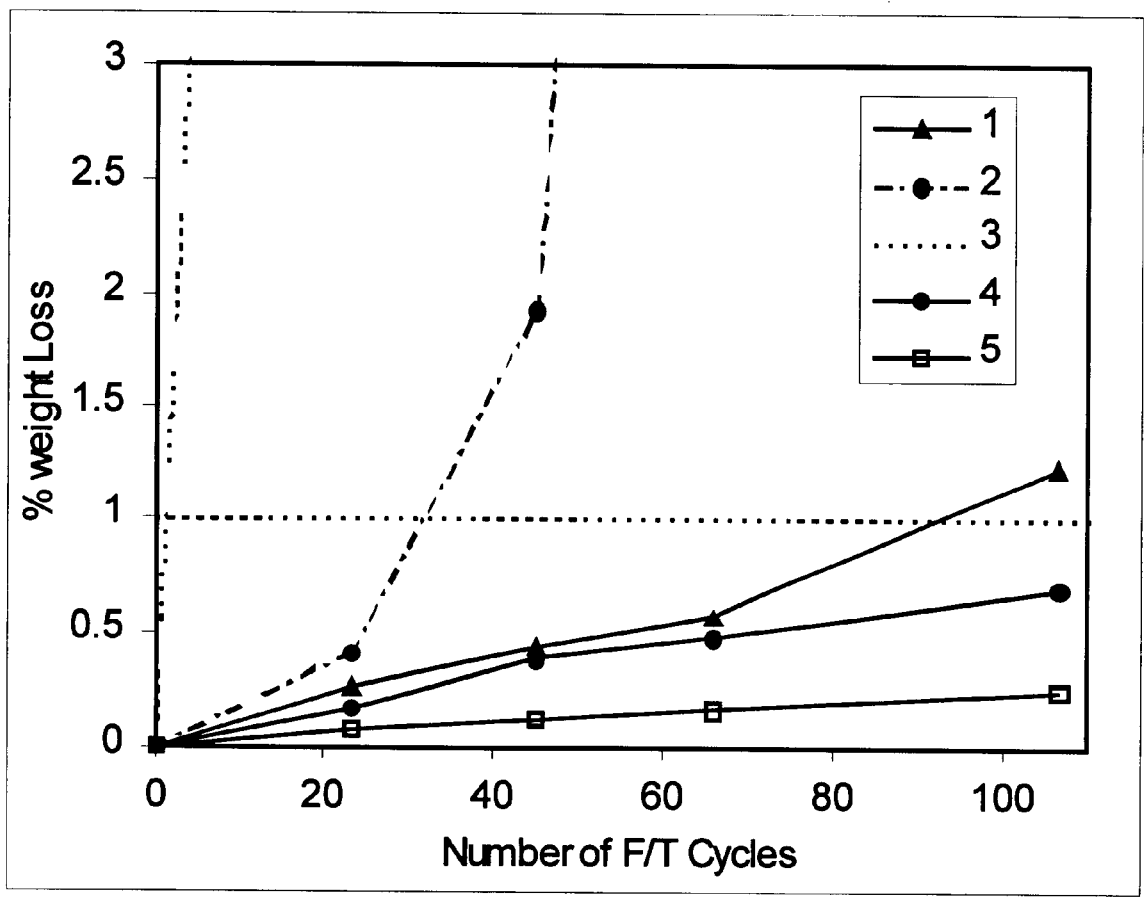
FIG. 1 is a graph of results of freeze-thaw testing on masonry concrete samples.

The term "masonry concrete" as used herein shall mean and refer to a cementitious composition containing a Portland cement 5–25% (s/s total dry weight composition) and 75–95% (s/s total dry weight composition) of a "relatively fine aggregate." In this case, the term "relatively fine aggregate" is defined as an aggregate blend or particle batch containing aggregates as fine or finer than Size Number 8 Coarse Aggregate as defined in ASTM C 33-97, and in which the final aggregate blend is virtually all less than 0.5 inch diameter and having less than 5% of the aggregate with diameters greater than or equal to 0.375 inch. This includes "concrete sand." Relatively fine aggregates may be determined by following the procedure described in ASTM C 136-96.

The present invention also pertains to structures formed from the masonry concretes of the invention. For example, the masonry concretes are typically allowed to harden to form a masonry unit having a structure for use in a segmental retaining wall, a paver, a block (e.g., architectural block, masonry block), pipe (segments, connectors), slab, or other unit structure shaped for use in a civil engineering or building structure.

The use of betaines in conventional concrete and mortar and other high fluidity concrete is known, but neither betaines nor air entraining agents of the more conventional type have been successfully deployed in masonry concrete to form masonry units having improved freeze-thaw (F/T) durability. For example, U.S. Pat. No. 5,679,150 of Kerkar et al. (which patent is incorporated herein fully by reference) discloses that in cements (for concretes and mortars) an oxyalkylene compound, such as an oxyalkylene ether adduct, could be used with a betaine to permit air entrainment in the presence of the oxyalkylene compound which was used as a shrinkage reduction agent. As another example, Japanese Patent Application Kokai No. SHO 5547259 (Laid Open Date: Apr. 3, 1980) of Kao Corporation disclosed that, in concrete or mortar, carboxybetaines and sulfobetaines, for example, could be employed. However, there has been no teaching or suggestion, until the discovery by the present inventors, that betaines could be used to entrain air in zero slump masonry concrete and masonry units made therefrom.

A suitable betaine for use in the present invention has the following formula

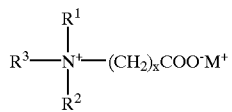

wherein $R^1$, $R^2$, and $R^3$ are independently alkyl groups or alkyl containing moeties, x is 1 to 5, and M is a metal cation, or ammonium. Preferably, M is sodium. Suitable metal cations are derived from any of the alkali, e.g., sodium or alkaline earth metals. Ammonium salts also are suitable. The compounds of this invention are typically added as metal salts.

Preferably, $R^1$ and $R^2$ are $C_1$–$C_4$ alkyl groups, and most preferably methyl groups. Preferable alkyl groups for $R^3$ are $C_{10}$–$C_{28}$ and include alkyl-containing moieties such as alkylamides, alkyl amido alkylenes, and substituted alkyls such as hydroxyalkyls. It is particularly preferred that $R^3$ is a $C_{10}$–$C_{20}$ alkylamido propyl, such as lauramido propyl and cocoamidopropyl. Other suitable betaines are listed in U.S. Pat. No. 5,679,150, the specification of which is incorporated fully herein by reference.

Another suitable type of betaine, a sulfobetaine, has the general formula

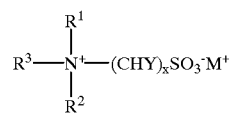

wherein $R^1$, $R^2$, and $R^3$, M and X are described as set forth above and Y is hydrogen or hydroxyl. A preferred sulfobetaine is cocoamido propyl hydroxy sultaine.

Other suitable betaines and sulfobetaines are disclosed in U.S. Pat. No. 4,209,337, the entire content of which is incorporated herein by reference. Methods for preparing betaines and sulfobetaines are known in the art. See U.S. Pat. No. 5,679,150 and references cited therein.

An exemplary masonry concrete of the present invention thus comprises a hydratable cement binder, such as Portland cement, in the amount of 5–25% based on total dry weight of the composition, a relatively fine aggregate portion comprising 75 to 95% based on total dry weight of solids in the composition; and a betaine, preferably a coco amido propyl betaine or coca amido hydroxy sultaine, in the amount of 0.01–1.0%, and more preferably 0.05–0.5% (s/s cement). When wet, the composition has essentially zero slump when tested by the standard cone method for measuring slump.

Further exemplary masonry concretes of the present invention, in addition to incorporating a betaine, further comprise an efflorescence control additive (ECAs), such as calcium stearate dispersion (CSD). The term "efflorescence control admixture," for purposes herein, also means and includes integral water repellants, and includes such ECAs as CSD, fatty acids and their salts or esters, polyvinyl alcohol, water-based latex, silanes, siloxanes, oils, or a mixture thereof. The amount of ECA in the masonry concrete may be 0.1 to 1.5%(s/s cement) and more preferably 0.2–0.8% (s/s). Illustrative fatty acid type efflorescence control agents of the invention, as mentioned above, comprise $C_4$–$C_{22}$ fatty acids or their salts or derivatives. The most preferred are lauric ($C_{12}$), myristic ($C_{14}$), palmitic ($C_{16}$), and stearic ($C_{18}$). Exemplary fatty acid salts include, without limitation, calcium stearate, zinc stearate, aluminum stearate, butyl oleate, a tall oil fatty acid, coconut fatty acid, or mixture thereof. Preferably, these are used in dispersion form (particles in aqueous suspension), and this includes fatty acids in combination with latexes.

The present invention also provides an admixture comprising betaine and an efflorescence control admixture (ECA). These are preferably used as separate admixtures, contained in separate packages; or they can be used mixed together. The amount of ECA to betaine dosed is preferably 5:1 to 1:1.

In another exemplary admixture, a water reducer is used in addition to the betaine. The water reducer may be incorporated in the amount of 0.05–1.0% (s/s based on cement). Exemplary water reducers may include naphthalene sulfonate; melamine sulfonate; hydroxycarboxylic acids and their salts; polycarboxylic acids and their salts; or a mixture thereof. Other exemplary water reducers comprise repeating units of oxyalkylene groups (such as ethylene oxide and propylene oxide) in linear or branched structures. Other exemplary water reducers comprise a polymer having a carbon-containing backbone to which are attached cement-anchoring members (e.g., hydroxycarboxylic acids, polycarboxylic acids, and their salts) and oxyalkylene groups attached to the backbone by linkages selected from the group consisting of an amide, an imide, and/or an ester. Suitable water reducers are taught in U.S. Pat. No. 5,393,343 which is incorporated herein by reference. Many water-reducers are known in the ready-mix concrete art. A commercially-available water reducer believed to be suitable for use in the present invention is a polyacrylic acid-based comb-type polymer available from Grace Construction Products under the tradename ADVA®.

Generally, exemplary water reducers contemplated for use in the present invention may comprise a polymer having a carbon-containing backbone to which are attached groups operative for binding cement particles (such as hydroxycarboxylic acids, polycarboxylic acids, and/or mixtures thereof and groups operative to disperse the polymer within an aqueous environment. The dispersing function may be accomplished by oxyalkylene units, preferably repeating ethylene oxide and/or propylene oxide repeating units, which may be located in the carbon-containing backbone of the polymer and/or in a group attached to the backbone.

Another exemplary water reducer believed suitable for use in the present invention comprises a copolymer of a polyoxyalkylene derivative as represented by the following formula (1) and maleic anhydride, a hydrolyzed product of the copolymer, or a salt of the hydrolyzed product;

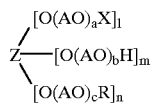

wherein "Z" represents a residue of a compound having from 2 to 8 hydroxy groups; "AO" represents an oxyalkylene group having from 2 to 18 carbon atoms; "X" represents an unsaturated hydrocarbon group having from 2 to 5 carbon atoms; "R" represents a hydrocarbon group having from 1 to 40 carbon atoms; "a" represents 1 to 1,000; "l" represents 1 to 7, "m" represents 0 to 2; and "n" represents 1 to 7; "l"+"m"+"n"=2 to 8, "m"/("l"+"n") is less than or equal to ½, and "al"+"bm"+"cn" is equal to or greater than 1. The copolymer shown above is taught in U.S. Pat. No. 4,946,904, issued to Akimoto et al., which patent is incorporated by reference as if fully set forth herein.

Another water reducer believed to be suitable for use in the present invention comprises water-soluble linear copolymers of N-vinylamides with monomeric addition products of amines, amino acids, amino groups containing aromatic sulfonic acids, amino alcohols of maleic anhydride as well as maleic esters of polyoxyalkyleneglycols or their monoethers. One structural unit is represented by Formula (A) or by Formula (B); the other partial structure unit being represented by Formula (C):

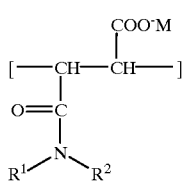

(A)

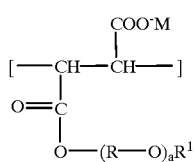

(B)

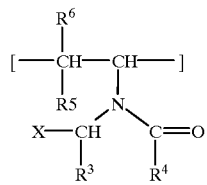

(C)

wherein $R^1$ and $R^2$, which may be the same or different, each represent hydrogen, a $C_1$–$C_{20}$ alkyl residue which may optionally include alkali metal carboxylate or alkaline earth metal carboxylate groups, an aromatic group, an aliphatic or cycloaliphatic residue which may optionally include sulfonic acid groups or alkali metal sulfonate or alkaline earth metal sulfonate groups, a hydroxyalkyl group, preferably a hydroxy ethyl- or hydroxypropyl group, or may together with the nitrogen atom to which they are bound, form a morpholine ring;

M represents a hydrogen ion, a monovalent or divalent metal ion or a substituted ammonium group;

R represents a hydrogen atom or an alkyl group having 1 to 4 carbon atoms; p, q, and r are integers; a represents an integer ranging from 1 to 100;

$R^3$ and $R^4$ which may be the same or different, each represent hydrogen, a $C_1$ to $C_{12}$-alkyl residue, a phenyl residue, or may together form a di-, tri-, or tetramethylene group, which form with the inclusion of the residue of the formula:

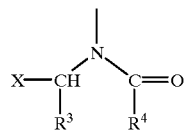

a five, six, or seven membered ring;

$R^5$ and $R^6$ which may be the same or different, each represent hydrogen, a $C_1$ to $C_{12}$-alkyl residue or phenyl residue; and X represents hydrogen, a $C_1$ to $C_4$-alkyl residue, a carboxylic acid group, or an alkali metal carboxylate group. Such copolymer is known and taught in U.S. Pat. No. 5,100,984 issued to Burge et al., and assigned to Sika AG, which patent is incorporated fully by reference as if set forth herein.

A further exemplary masonry concrete composition of the invention, in addition to the betaine described above, may further comprise the use of certain nonionic alkylaryl polyether alcohols. For example, the composition may further comprise an alkylaryl polyether alcohol having the general formula R—Ø—(OCH$_2$CH$_2$)$_x$OH, wherein R is a $C_4$–$C_8$ alkyl group (most preferably, a branched octyl group), Ø represents a phenol group, and "X" represents an integer in the range of 3–70. In addition to using the alkylaryl polyether alcohol, at least one ECA (e.g., $C_4$–$C_{22}$ fatty acid or its salt or derivative; e.g., calcium stearate in dispersion form) may optionally be used. Preferably, alkylaryl polyether alcohols having a higher length of polyoxyethylene chain, where X is in the range of 5–20, is preferred for use with masonry concrete as contemplated in the present invention. Preferred commercially available TRITON® agents are available as TRITON® X-45 (where the average value of X is 5); TRITON® X-114 (average value X=7–8); and TRI- TON® X-100 (average value X=9–10). Exemplary dosage rates of alkylaryl polyether alcohols are in the range of 0.001 to 5.0 percent by weight based on total dry weight of cement (binder) in the masonry concrete.

An exemplary method of the invention comprises providing a masonry concrete, comprised of a cement binder and relatively fine aggregate (and having virtually all aggregate less than 0.5 inch diameter and with less than 5% of the aggregate particles having a diameter greater than or equal to 0.375 inch), and a zero slump (e.g., slump of 0–0.75 when tested by the standard cone method). Further exemplary methods further provide for incorporation of ECAs and/or water reducers, all as previously described.

The present invention may be further appreciated in light of the following example.

EXAMPLE 1

Masonry units (SRW) were made using approximately 1807 lbs. of concrete sand, 900 lbs. of high friction sand, and 1993 lbs. of crushed limestone. Approximately 705 lbs. of Portland cement was added to the batch. Water was added to the batch, and the batch was mixed for approximately 5 minutes in a spiral ribbon mixer.

Various admixtures (as summarized in Table 1 below) were added along with mix water. A calcium stearate dispersion (CSD), commercially available under the tradename SALINON® SRC from W. R. Grace & Co.-Conn., Cambridge, Mass., was added to each of the samples so as to permit evaluation of the effect of air entraining agents in the presence of an efflorescence control agent. Small amounts of a plasticizer (e.g., nonyl phenol ethoxylate) were added to all batches to aid the molding and de-molding operation. Measured batches of the mix were fed into the molding machine and molded into solid units (8"×6"×18") using a commercial block-making machine. After molding, the units were cured in a steam kiln (maintained at ~110° F.) for approximately 10 hours. The masonry units were further cured in ambient air for at least 28 days prior to testing.

TABLE 1

| Run # | Admixture | Cement Content % | Plasticizer Dose oz/cwt of cement | ECA Type | ECA Dose, Oz/cwt | AEA dose % (s/s cement) |
|---|---|---|---|---|---|---|
| 1 | Blank | 17 | 1 | CSD | 36 | — |
| 2 | Gum Rosin (Dry) | 15 | 1 | CSD | 36 | 0.25 |
| 3 | VINSOL ™ Resin (Dry) | 15 | 1 | CSD | 36 | 0.40 |
| 4 | Betaine (Dry) | 15 | 1 | CSD | 36 | 0.18 |
| 5 | Betaine (Liquid) | 15 | 1 | CSD | 36 | 0.20 |

Samples were cut from the masonry units after air-curing using a wet saw and dried in air for approximately 48 hours. The samples were then subjected to F/T testing using ASTM C 1262-95 test procedure.

Results of the F/T testing are summarized in FIG. 1. As seen in FIG. 1, the reference mix #1, registered more than 1 weight percentage loss after 100 F/T cycles, indicating the adverse effect of the ECAs on the F/T durability of the masonry units. Incorporation of conventional air entraining admixtures, such as gum rosin (mix #2) and VINSOL (tm) resin (mix #3) in combination with fatty acid-based ECA seem to have a very adverse effect on the F/T durability of the masonry concrete. Samples containing betaine (both in the dry and liquid form), however, indicate a superior F/T performance. The samples containing betaine (mix #4 and 5) registered significantly less than 1 wt. % loss in weight even after 100 F/T cycles, in spite of a reduction in the cement content of the mix by two percentage points.

Figure 2A:
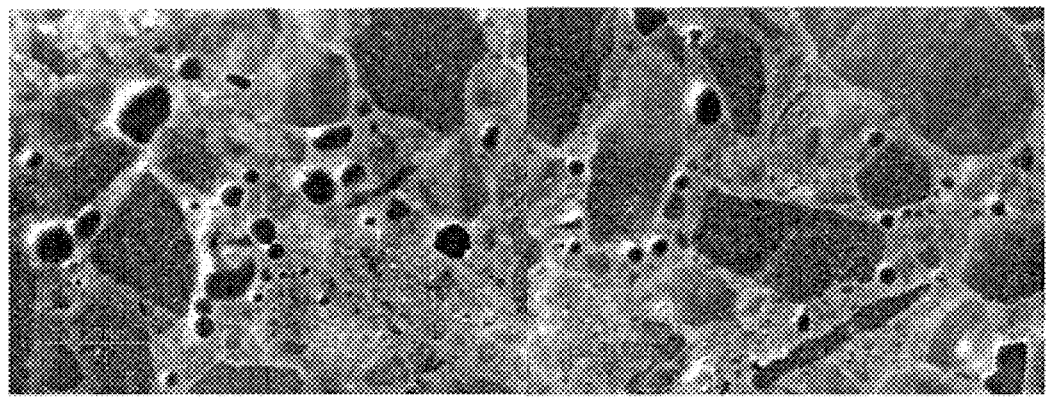
FIG. 2(a) is a microphotograph of entrained air voids (spherical) from sample mix 5.
Figure 2:
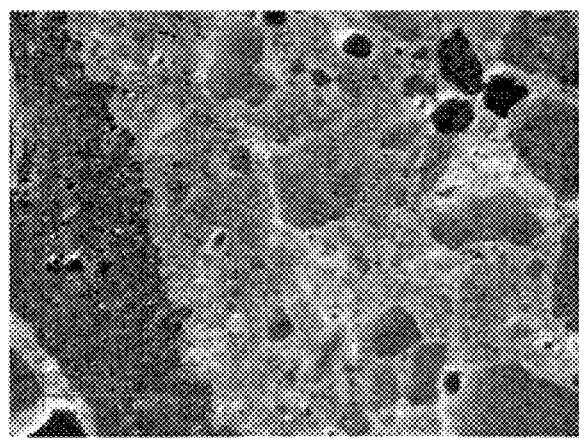
FIG. 2(b) is a microphotograph of sample mix 3 showing that no entrained air voids (spherical) were present.

Additional samples from each batch were cut and polished for microscopic observation. The polished coupons were observed under a polarized light microscope for presence of air voids in the cement paste. Typical microstructures observed during the examination are shown in FIG. 2. Coupons from mix #5 (as also from mix #4) clearly exhibit presence of micro-bubbles in the cement paste fraction FIG. 2(a). On the other hand, coupons containing conventional air entraining agents such as VINSOL (tm) resin (mix #3), do not indicate presence of any air bubbles in the cement paste micro structure.

The current finding is unexpected and novel because contrary to the performance expected from traditional air entraining admixtures, such AEAs do not appear to be effective in entraining air in masonry mixes containing fatty acid ECAs. Betaines, on the other hand, are surprisingly found to be effective in entraining air in masonry concrete mixes containing fatty acid ECAs.

A further test was run without the use of calcium stearate, and it was confirmed that only betaine operated to entrain small observable air bubbles in the cement paste portion.

The foregoing examples are provided for illustration only and are not intended to limit the scope of the invention, as claimed.

We claim:

1. A masonry concrete composition comprising: a hydratable cement binder comprising 5–25% based on total dry weight of the composition; a relatively fine aggregate portion comprising 75–95% based on total dry weight of solids in the composition, said relatively fine aggregate portion being defined as an aggregate blend or particle batch containing aggegates as fine as or finer than Size Number 8 Coarse Aggregate as defined in ASTM C 33-97; a betaine in the amount of 0.01–1.0% (s/s cement); the composition, when wet, having essentially zero slump when tested by the standard cone method for measuring slump.

2. The composition of claim 1 wherein said composition, upon the addition of water, is allowed to harden to form at least one masonry unit comprising a segmental retaining wall unit, a paver, a block, a pipe, a slab, or a structure shaped for use in a civil engineering or building structure.

3. The composition of claim 2 wherein said composition, when hardened into a masonry unit, comprises a compaction air void volume of 2 to 20% based on total volume of the masonry unit.

4. The composition of claim 1 wherein said relatively fine aggregate comprises aggregate particles wherein less than 5% of said particles have a diameter greater than or equal to 0.375 inch diameter.

5. The composition of claim 1 wherein said betaine comprises a coco amido propyl betaine.

6. The composition of claim 1 wherein said betaine has the formula

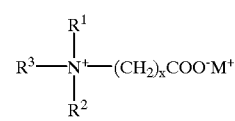

wherein $R^1$, $R^2$, and $R^3$ are independently alkyl groups or alkyl containing moieties, x is 1 to 5, and M is a metal cation, or ammonium.

7. The composition of claim 6 wherein M comprises an alkali or alkaline earth metal or an ammonium salt.

8. The composition of claim 1 wherein said betaine has the formula

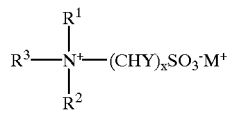

wherein $R^1$, $R^2$, and $R^3$ are independently alkyl groups or alkyl containing moieties, x is 1 to 5, M is a metal cation, or ammonium, and Y is hydrogen or hydroxyl.

9. The composition of claim 8 wherein said betaine comprises coco amido propyl hydroxy sultaine.

10. The composition of claim 1 further comprising an efflorescence control agent in an amount of 0.1–1.5% (s/s cement), said efflorescence control agent comprising calcium stearate, a fatty acid or salt or ester thereof, polyvinyl alcohol, water-based latex, silane, siloxane, oil, or a mixture thereof.

11. The composition of claim 10 wherein said efflorescence control agent comprises calcium stearate.

12. The composition of claim 11 wherein said efflorescence control agent comprises a calcium stearate dispersion.

13. The composition of claim 1 further comprising a water reducer in an amount of 0.5–1.0% (s/s cement), said water reducer comprising a naphthalene sulfonate, melamine sulfonate, hydroxycarboxylic acid or salt thereof, polycarboxylic acid or salt thereof, repeating oxyalkylene groups in linear or branched structures, or mixture thereof.

14. The composition of claim 13 wherein said water reducer comprises naphthalene sulfonate, melamine sulfonate, a hydroxycarboxylic acid or its salt, a polycarboxylic acid or its salt; or a mixture thereof.

15. The composition of claim 13 wherein said water reducer comprises a polyacrylic acid based comb polymer.

16. The composition of claim 1 further comprising an alkylaryl polyether alcohol having the general formula R—Ø—(OCH$_2$CH$_2$)$_x$OH, wherein R is a C$_4$–C$_8$ alkyl group, Ø represents a phenol group, and "X" represents an integer in the range of 3–70.

17. An admixture for improving durability in masonry units, comprising a betaine and an efflorescence control agent, said betaine to efflorescence control agent being in a ratio of 5:1 to 1:1, said efflorescence control agent comprising a calcium stearate dispersion, fatty acid or salt or ester thereof, polyvinyl alcohol, water-based latex, silane, siloxane, or a mixture thereof.

18. The admixture of claim 17 wherein said efflorescence control agent comprises a calcium stearate dispersion.

19. The admixture of claim 17 further comprising a water reducer in an amount of 0.5–1.0% (s/s cement) said water reducer comprising a naphthalene sulfonate, melamine sulfonate, hydroxycarboxylic acid or salt thereof, polycarboxylic acid or salt thereof, repeating oxyalkylene groups in linear or branched structures, or mixture thereof.

20. A method for enhancing freeze thaw durability in masonry concrete, comprising: providing a masonry concrete comprising a hydratable cement binder comprising 5–25% based on total dry weight of the composition; a relatively fine aggregate portion comprising 75–95% based on total dry weight of solids in the composition, said relatively fine aggregate portion being defined as an aggregate blend or particle batch containing aggregates as fine as or finer than Size Number 8 Coarse Aggregate as defined in ASTM C 33-97, said masonry concrete, when wet, having essentially zero slump when tested by the standard cone method for measuring slump; and incorporating into said masonry concrete a betaine in the amount of 0.1–1.0% (s/s cement).

21. The method of claim 20 further comprising incorporating an efflorescence control agent in an amount of 0.1–1.5% (s/s cement), a water reducer in an amount of 0.5–1.0% (s/s cement), or a mixture thereof; said efflorescence control agent comprises calcium stearate dispersion, fatty acids and their salts or esters, polyvinyl alcohol, water-based latex, silanes, siloxanes, oils, or a mixture thereof; and said water reducer comprising a naphthalene sulfonate, melamine sulfonate, hydroxycarboxylic acid or salt thereof, polycarboxylic acid or salt thereof, repeating oxyalkylene groups in linear or branched structures, or mixture thereof.

22. The method of claim 20 further comprising incorporating an alkylaryl polyether alcohol having the general formula R—Ø—(OCH$_2$CH$_2$)$_x$OH, wherein R is a C$_4$–C$_8$ alkyl group, Ø represents a phenol group, and "X" represents an integer in the range of 3–70.

* * * * *